United States Patent [19]
Shepherd

[11] Patent Number: 6,126,154
[45] Date of Patent: Oct. 3, 2000

[54] CENTERING SYSTEM

[76] Inventor: John D. Shepherd, 13822 Bruns Rd., Manhattan, Ill. 60442

[21] Appl. No.: 09/248,201

[22] Filed: Feb. 10, 1999

[51] Int. Cl.[7] ........................................................ F16F 1/00
[52] U.S. Cl. ............................ 267/150; 267/34; 267/221
[58] Field of Search .......................... 267/256, 34, 64.26, 267/66, 67, 68, 69, 71, 121, 150, 169, 170, 221, 286, 291

[56] References Cited

U.S. PATENT DOCUMENTS

| | | | |
|---|---|---|---|
| 1,223,573 | 4/1917 | Eldredge . | |
| 4,406,473 | 9/1983 | Sexton . | |
| 4,736,931 | 4/1988 | Christopherson | 267/34 |
| 4,822,012 | 4/1989 | Sketo | 267/221 |

OTHER PUBLICATIONS

Industrial Gas Springs Inc. Brochure Apr. 1997.
Safe–T–Plus Brochure Nov. 1997.

*Primary Examiner*—Robert J. Oberleitner
*Assistant Examiner*—Pamela J. Lipka
*Attorney, Agent, or Firm*—Mason, Kolehmainen, Rathburn & Wyss; Philip M. Kolehmainen

[57] ABSTRACT

A system for centering a relatively movable member relative to a relatively fixed member includes telescoped inner and outer cap tubes with opposed closed ends adapted to be connected to the fixed and movable members. A strut tube assembly within the cap tubes includes a gas spring unit that is compressed by a force transfer tube assembly when the system is compressed or extended. Resilient bumpers smooth the force transition near the centered position. A set screw permits adjustment of the system to have preload or no preload or to have free play at the centered position. The system is easily adapted to specific requirements by selection of the gas spring unit and the material of the bumpers and by adjustment of the set screw.

6 Claims, 3 Drawing Sheets

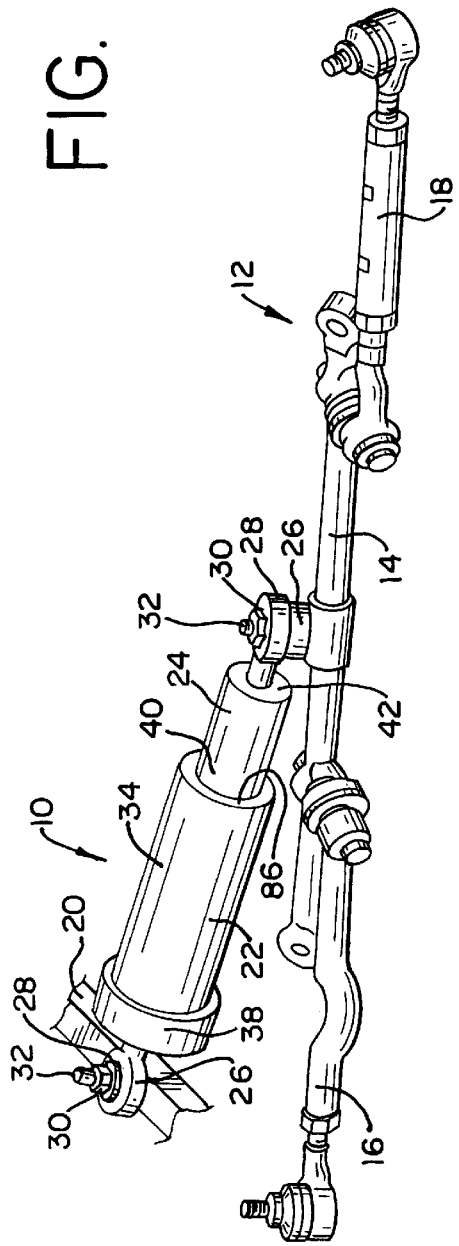
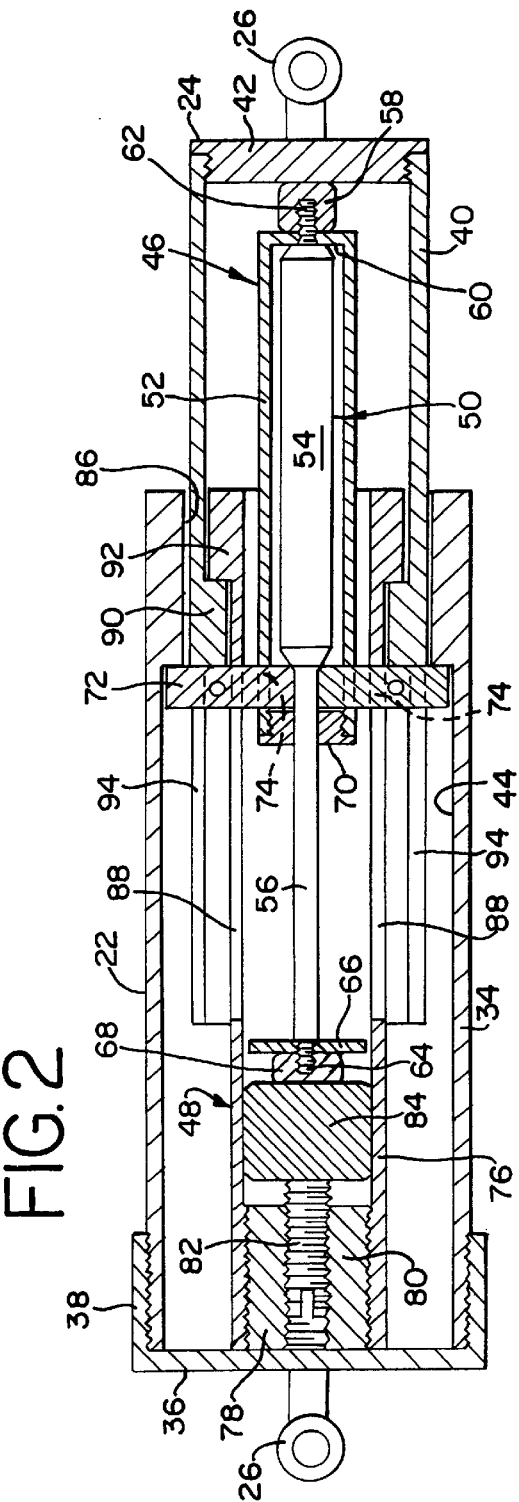

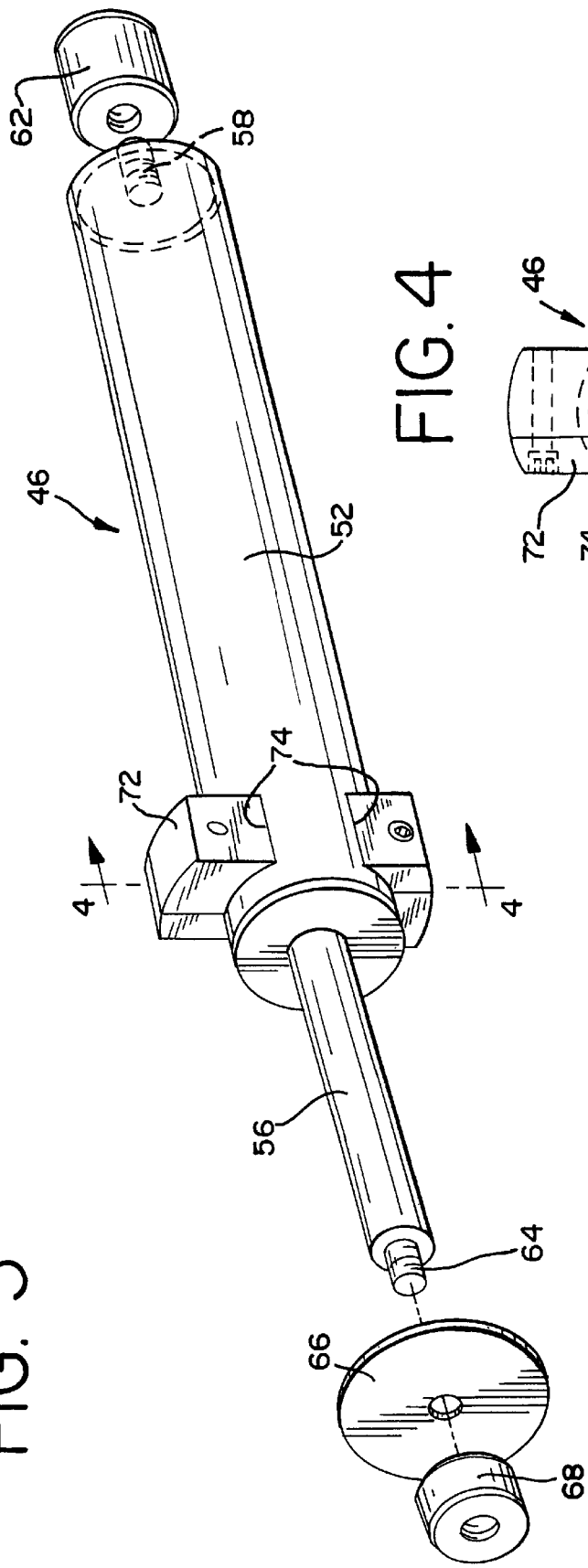
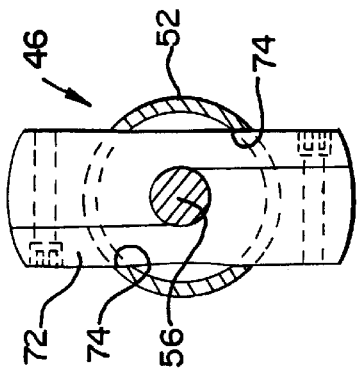

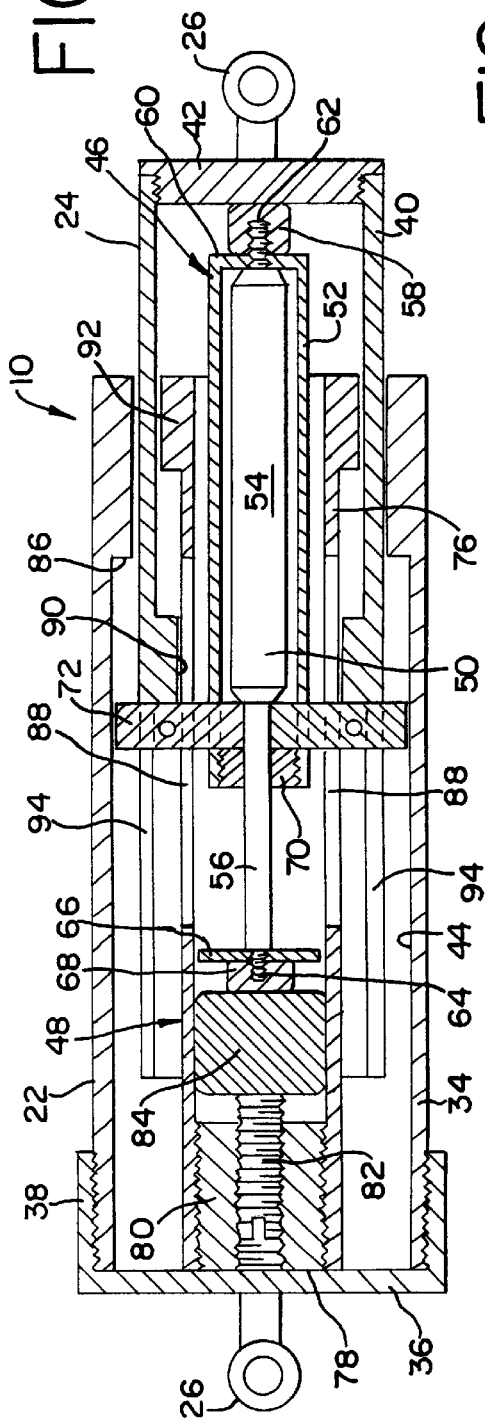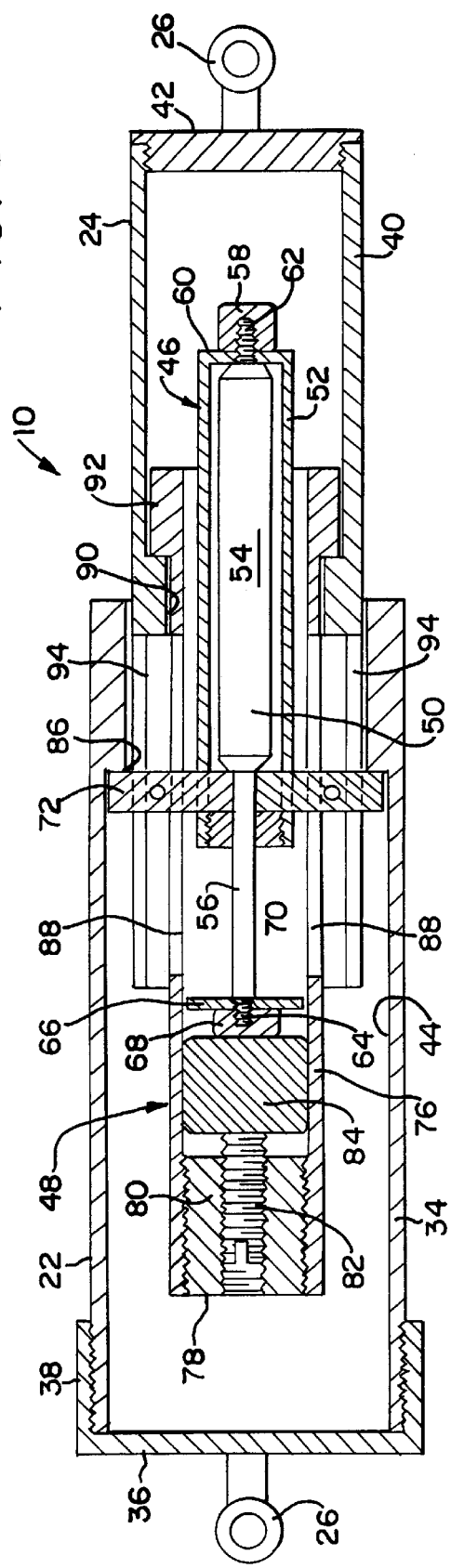

CENTERING SYSTEM

FIELD OF THE INVENTION

The present invention relates to an improved system for maintaining a movable member, such as a vehicle steering linkage component, in a normal or centered position relative to a fixed member, such as a vehicle frame component.

DESCRIPTION OF THE PRIOR ART

There is a long standing need for a centering system or stabilizer for maintaining a movable member in a normal or centered position relative to a fixed member. A good example of an application exhibiting such a need is the steering system of a large vehicle such as a truck or recreational vehicle. Other examples are conveyors and manufacturing equipment, power boats, vehicles of many types and trailer hitch systems. In a vehicle application, a centering system should be able to hold the vehicle under control in the presence of cross winds, road irregularities, tire blow outs and the like.

Many stabilizing or centering systems have been developed or proposed in the past. For example, U.S. Pat. Nos. 1,223,573 and 4,406,473 disclose vehicle steering stabilizer systems using a pair of coil springs urging a component of the vehicle steering linkage toward a centered or normal position. As another example, U.S. Pat. No. 4,822,012 discloses a bidirectional steering stabilizer having a single spring and a damper for yieldably biasing the wheels of a vehicle toward a straight ahead direction. Although these systems are relatively simple in that they are mechanical devices with relatively few parts, they suffer from disadvantages including requiring the vehicle operator to overcome large forces to turn the vehicle and a lack of the ability to easily adjust the mechanism to match the requirements of a particular vehicle or application.

Another approach that has been used in the past is to provide a complex hydraulic and pneumatic system for assisting the power steering system of a large vehicle in holding the steering linkage and wheels on center. One example of a system of this type is the Howard Power Center Steering System sold by River City Products, Inc. of San Antonio, Tex. Although this steering control system performs well, it is subject to the disadvantages of complexity and large expense.

SUMMARY OF THE INVENTION

A principal object of the present invention is to provide an improved stabilized centering assembly for the control of vehicle steering systems and the like; to provide a centering system in which the need for large operating forces can be avoided; to provide a centering system that can easily be adjusted and tailored to the particular requirements of any vehicle or other application; to provide a centering system that is bidirectional and symmetrical in operation; to provide a centering system that can be adjusted to provide a neutral centered position or to alternatively provide slack or preload at the centered position; and to provide a stabilized centering system overcoming disadvantages of systems used in the past.

In brief, in accordance with the invention there is provided a stabilized centering system for biasing a relatively movable member to a centered position relative to a relatively fixed member. The stabilized centering system includes first and second telescoped cap tubes having open ends and opposed closed ends. Attachment devices on the closed ends of the cap tubes are adapted to connect the cap tubes to the relatively fixed and movable members. The cap tubes define an axially extending elongated internal chamber that contracts and elongates in response to movement of the relatively movable members toward and away from one another. A strut assembly mounted in the chamber includes a strut body and a gas spring unit within the body having a rod extending axially from the body and normally biased to an extended position. A force transfer member received within the chamber partly encloses the strut assembly. The force transfer tube has an end portion located between the strut assembly and the first cap tube. A resilient bumper is between the end portion of the force transfer member and the strut assembly. The bumper and the force transfer portion end portion transfer axial compressive force from the cap tubes to the strut assembly to compress the gas spring unit in response to movement of the cap tubes toward one another. The force transfer member and the second cap tube have a first interlock structure for pulling the end portion away from the first cap tube and the strut body and the first cap tube having a second interlock structure for pulling the strut body away from the second cap tube and compressing the gas spring unit in response to movement of the cap tubes away from one another.

BRIEF DESCRIPTION OF THE DRAWING

The present invention together with the above and other objects and advantages may best be understood from the following detailed description of the preferred embodiment of the invention illustrated in the drawings, wherein:

FIG. 1 is a fragmented isometric view of parts of the steering linkage and frame of a vehicle provided with a stabilized centering system constructed in accordance with the present invention;

FIG. 2 is an axial cross sectional view of the centering system;

FIG. 3 is an isometric view of the strut assembly of the centering system;

FIG. 4 is a cross sectional view taken along the line 4—4 of FIG. 3;

FIG. 5 is a view similar to FIG. 2 illustrating the centering system in a compressed condition; and FIG. 6 is a view like FIG. 2 illustrating the centering system is an extended condition.

DETAILED DESCRIPTION OF THE PREFERRED EMBODIMENTS

Having reference now to the drawings and initially to FIG. 1, there is illustrated a stabilized centering system generally designated as 10 and constructed in accordance with the principles of the present invention. The centering system 10 is mounted on a vehicle steering system 12 including a center link 14 and outer tie rods 16 and 18. When the steering wheel of the vehicle is turned, the center link 14 is moved transversely to move the tie rods 16 and 18; thereby to turn the wheels of the vehicle.

The centering system 10 of the present invention is connected between the center steering link 14 and an element 20 of the vehicle frame. The centering system 10 includes first and second cap tubes 22 and 24 each supporting a connecting device in the form of an attachment collar 26 held in place on the vehicle by a washer 28 and nut 30 engaging a mounting stud 32. The centering system 10 continuously urges the steering linkage toward a normal or centered position in which the vehicle wheels are in their straight ahead position.

Referring now to FIG. 2, the centering system 10 is shown in axial cross section. The first cap tube 22 includes a cylindrical side wall 34 and a closed end wall 36. The closed end wall 36 is provided by a removable threaded cap 38. The second cap tube 24 includes a cylindrical side wall 40 and a closed end wall 42. The attachment devices 26 extend axially from the end walls 36 and 42. The attachment devices may take the form of eyes, collars, balls or studs or the like depending upon mounting requirements. The first and second cap tubes 22 and 24 are telescoped together, with the side wall 34 outside of the side wall 40. The closed end walls 36 and 42 are opposed to one another, and the cap tubes 22 and 24 enclose an elongated axially extending internal chamber 44 that varies in length as the cap tubes 22 and 24 move toward or away from one another. If desired a flexible boot or dust cover can be mounted over the cap tubes 22 and 24 to provide a sealed assembly.

A strut tube assembly 46 and a force transfer tube assembly 48 are mounted within the internal chamber 44. The strut tube assembly 46 includes a gas spring unit 50 contained within a tubular strut body 52. The gas spring unit 50 includes a hollow tubular housing 54 containing a piston assembly including a piston rod 56 extending axially from the housing. As is well known to those skilled in the art, a compressed gaseous medium, typically nitrogen, within the housing 54 normally holds the rod 56 is its extended position seen in FIGS. 2 and 3. Movement of the rod 56 into the housing 54 is resisted by a reaction force caused by further compression of the gas within the housing. A liquid can be provided within the housing to provide a damping function. The term "gas spring unit" is defined for the purpose of the present disclosure as a conventional gas spring of the type well known to those skilled in the art, as exemplified by the gas spring units described in an April, 1997 catalog of Industrial Gas Springs Inc. of Newtown Square, Pa. This catalog is made of record herein contemporaneously with the filing of the present application and is incorporated herein by reference.

The end of the gas spring housing 54 opposite the piston rod 56 is provided with a threaded stud 58 that extends through a closed end wall 60 of the strut body 52 and is threaded into a bumper member 62 to secure the housing 54 within the body 52. The end of the piston rod 56 is provided with a threaded stud 64 that extends through an alignment disk 66 and is threaded into another bumper 68. Opposite the closed end wall 60, an end cap 70 is threaded into the open end of the strut body 52. The piston rod 56 slideably extends through a central hole in the cap 70. A pull bar 72 fits in diametrically aligned slots 74 in the strut body. As seen in FIG. 4, the pull bar 72 may be of a two part construction to facilitate assembly.

The force transfer tube assembly includes a force transfer tube 76 having an end portion 78 located between the closed end 36 of the first or outer cap tube 22 and the strut tube assembly 46. The end portion 78 includes a cap member 80 threaded into the end of the force transfer tube 76. An adjustment member, preferably a set screw 82, is threaded into the cap member 80. In the illustrated embodiment of the invention, a rigid spacer block 84 is sandwiched between the set screw 82 and the bumper 68.

The cap tubes 22 and 24, the strut body 52 and the force transfer tube 76 are all telescoped together and are all slidable axially relative to one another to a limited extent. Structure is provided for limiting this axial sliding movement and for compressing the gas spring unit 50 in response to movement of the relatively movable center link 14 away from the normal or centered position relative to the relatively fixed vehicle frame member 20.

More specifically, the cap tubes 22 and 24 are seen in their normal, centered position in FIG. 2. In this position, the gas spring unit 50 is in its normal position with the piston rod 56 extended. The pull bar 72 is in contact with an inner collar 86 of the first, outer cap tube 22. The set screw 82 is axially adjusted to take up all slack in the system so that the centering system 10 applies no force to the relatively movable member 14 in the centered position. The bumpers 62 and 68 are not compressed. In many applications of the centering system, this is the preferred adjustment because there is a return force whenever the relatively movable link 14 moves from the centered position, but there is no preload force to be overcome by the user in moving the member 14 away from the centered position.

One advantage of the centering system 10 is that it may easily be adjusted to provide slack or preload at the centered position. The end cap 38 is removed in order to permit access to the set screw 82 in the cap member 80. If preload is desired, the set screw is threaded further into the cap member 80 to compress the bumpers 62 and 68, and if desired, to force the piston rod 56 partly into the gas spring housing 54, and the end cap 38 is replaced. When the centering system 10 is adjusted for preload, it holds the movable member 14 in the centered position with a constant force that must be overcome to move the member 14 away from the centered position. In some applications, for example in large trucks and construction equipment, this may be the preferred adjustment.

Alternatively, the set screw 82 may be threaded in the opposite direction, axially away from the strut tube assembly 46, in order to provide slack at the centered position. When adjusted in this way, axial space or slack is present in the system between the set screw 82 and the spacer 84, between the spacer 84 and the bumper 68 and/or between the bumper 62 and the closed end wall 42 of the second, inner cap tube 24. This provides a region of free play around the centered position and may be preferred in certain applications of the centering system where added force to move the movable member 14 from the centered position is not desirable.

The centering system 10 is bilateral and symmetrical in operation. It imposes a consistent stabilizing return force when the movable member or link 14 is moved in either direction away from the centered position. FIG. 5 illustrates the operation of the centering system 10 when it is axially compressed, for example by movement of link 14 to the left as seen in FIG. 1. In this position, the closed end wall 42 of the inner cap tube 24 bears against the bumper 62 applying a compressive force to the strut tube assembly 46. The closed end wall 36 of the outer cap tube 22 acts through the end portion 78 of the force transfer tube assembly 48 (i.e., the cap 78 and set screw 82) and the spacer 84 to apply an equal and opposite force acting through the bumper 68 against the opposite end of the strut tube assembly 46. The piston rod 56 unit is moved axially into the housing 54 and the gas spring unit 50 is compressed. Axial slots 88 in the force transfer tube 76 permit the pull bar 72 to move axially relative to the force transfer tube assembly 48. The reactive force applied by the compressed gas spring unit 50 yieldingly urges the movable member 14 back to its centered position.

FIG. 6 illustrates the extended position of the centering system 10, occurring for example when the link 14 moves to the right in FIG. 1. In this position, an inner collar 90 of the inner cap tube 24 engages a flange 92 at the end of the force transfer tube 76. Engagement of the collar 90 and flange 92 provides an interlock causing the cap tube 24 and the force transfer tube assembly 48 to move together, and the end portion 78 applies a compressive force to the bumper 68 and to the strut tube assembly 46. The pull bar 72 engages the inner collar 86 to provide another interlock so that the outer cap tube 22 and the strut body 52 move together and apply an opposed compressive force to the strut tube assembly 46. Axial slots 94 in the inner cap tube side wall 40 permit the pull bar 72 to move axially relative to the inner cap tube 24. The gas spring unit 50 is compressed, and the reactive force applied by the compressed gas spring unit 50 yieldingly urges the movable member 14 back to its centered position.

Because the single gas spring unit 50 provides the reactive centering force both when the centering system 10 is compressed and when it is extended, the centering or return forces are symmetrical in both directions. Use of a single gas spring unit provides a simple and economical construction. The unit can be provided with any of a large number of gas spring units having different characteristics to match the requirements of any given application. As compared with coil springs, gas spring units are able to provide a larger range of operating forces in a small package, as well as the ability to include desired damping characteristics without added components. In addition, gas spring units, even those of small physical size, can be provided with low spring constants. A feature of the present invention is that the centering system 10 can not only be designed with widely ranging characteristics to match particular requirements, but a single system can be easily disassembled in order to replace the gas spring unit with one having the same axial dimensions but having entirely different force, spring constant and damping characteristics.

The bumpers 62 and 68 are selected to provide a smooth force transition so that the movable member 14 is first moved from the centered position without initially compressing the gas spring unit 50. The smooth transition provides a desirable feel to the user of the system 10 and avoids the need for large input forces. The magnitude of the initial force is controlled by selection of the material of the bumpers. A rubber or elastomeric material with a desired durometer hardness is preferred. The bumpers can be replaced to adjust the initial force and the feel of the system 10. If desired the bumper 62 could be omitted or replaced with a rigid element in view of the fact that the bumper 68 is effective in both compression and extension of the centering system 10. The rigid spacer 84 could be made integral with the end portion 78 or with the bumper 68.

In a preferred embodiment of the invention, when the centering system 10 is used with a light truck, the gas spring unit is a Model No. 101-6-14-72T-150 gas spring having a 150 pound spring force available from Industrial Gas Springs, Inc. of 4615 West Chester Pike, Newtown Square, Pa. For a heavier truck, a preferred gas spring unit is a Model No. 101-6-14-72-T270 270-pound spring force unit available from the same source. For other vehicles and other types of applications such as power boats and industrial applications such as conveyors and the like, other gas spring units can be selected to meet specific requirements. Spring values can be from a few pounds to thousands of pounds with a wide range of spring constants.

While the present invention has been described with reference to the details of the embodiment of the invention shown in the drawing, these details are not intended to limit the scope of the invention as claimed in the appended claims.

What is claimed is:

1. A stabilized centering system for biasing a relatively movable member to a centered position relative to a relatively fixed member, said stabilized centering system comprising;

first and second telescoped cap tubes having open ends and opposed closed ends;

attachment devices on said closed ends of said cap tubes adapted to connect said cap tubes to the relatively fixed and movable members;

said cap tubes defining an axially extending elongated internal chamber that contracts and elongates in response to movement of the relatively movable members toward and away from one another;

a strut assembly mounted in said chamber and including a strut body and a gas spring unit within said body having a rod extending axially from said body and normally biased to an extended position;

a force transfer member received within said chamber and partly enclosing said strut assembly, said force transfer member having an end portion located between said strut assembly and said first cap tube;

a resilient bumper interposed between said end portion of said force transfer member and said strut assembly;

said bumper and said force transfer portion end portion transferring axial compressive force from said cap tubes to said strut assembly to compress said gas spring unit in response to movement of said cap tubes toward one another; and said force transfer member and said second said cap tube having a first interlock structure for pulling said end portion away from said first cap tube and said strut body and said first cap tube having a second interlock structure for pulling said strut body away from said second cap tube and compressing said gas spring unit in response to movement of said cap tubes away from one another.

2. The stabilized centering system of claim 1, said resilient bumper comprising an elastomeric body.

3. The stabilized centering system of claim 1, further comprising a second resilient bumper interposed between said strut assembly and said second cap tube.

4. The stabilized centering system of claim 1, said end portion of said force transfer member having an axially movable adjustment element for varying the axial distance between said first cap tube and said strut assembly.

5. The stabilized centering system of claim 4, said adjustment element comprising a set screw.

6. The stabilized centering system of claim 5, said closed end of said first cap tube being removable for access to said set screw.

* * * * *